United States Patent Office 3,280,537
Patented Oct. 25, 1966

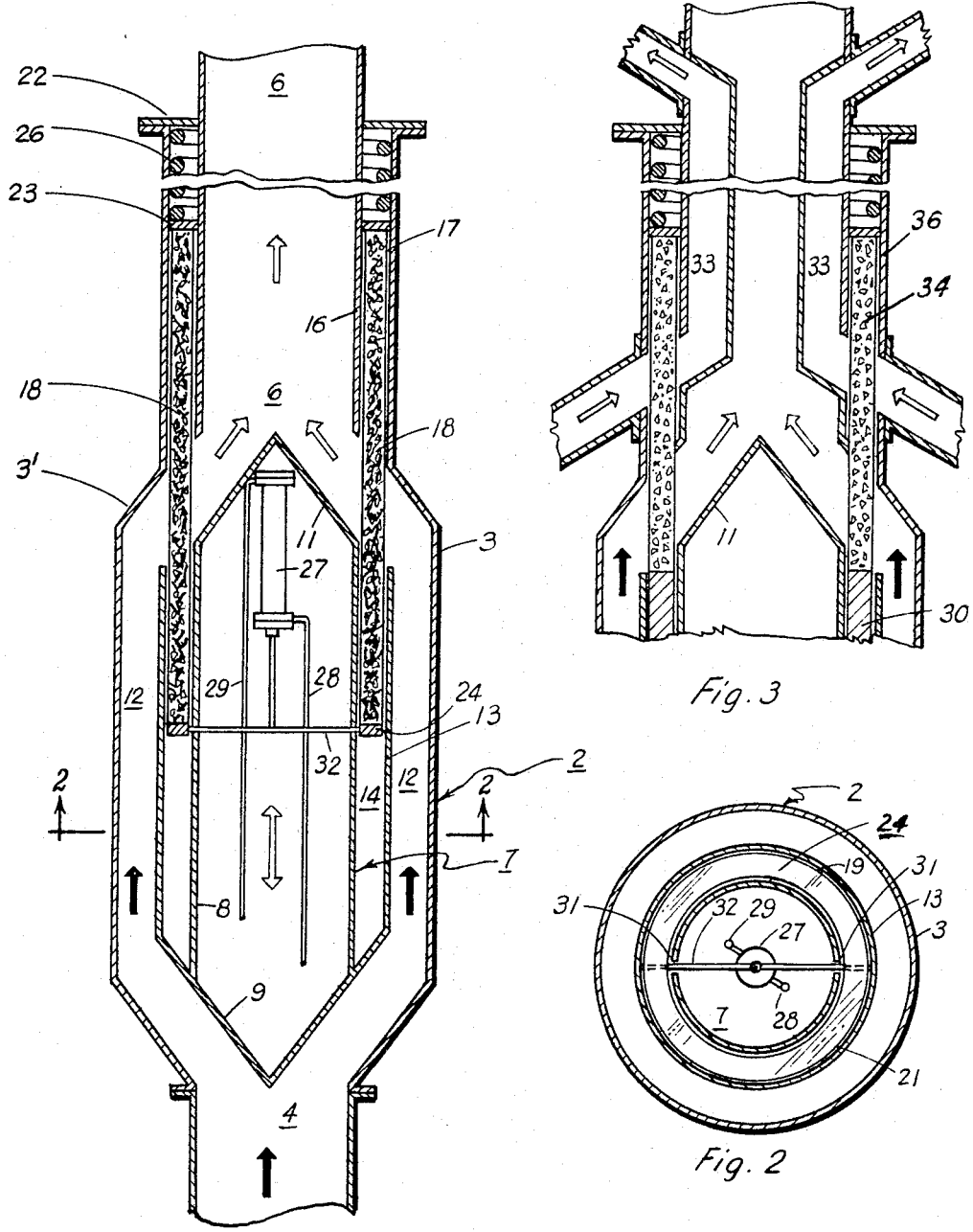

3,280,537
CONDUIT GAS FILTER ASSEMBLY
Willem J. Hagendoorn, Louisville, Ky., assignor to American Air Filter Company, Inc., Louisville, Ky., a corporation of Delaware
Filed July 8, 1965, Ser. No. 470,409
3 Claims. (Cl. 55—301)

The present invention relates to gas filter assemblies and more particularly to conduit gas filter assemblies wherein filter media can be fed in a continuous manner across a gas treating passage.

The present invention provides an economical, straightforward gas conduit filter structure which permits rapid and efficient installation and removal of replaceable filter media units into a conduit system. In addition, the present invention provides an arrangement wherein each filter unit can be fed in a continuous fashion across a gas-treating passage to permit ready media renewal as the occasion arises without extended interruptions of gas flow. Further, the present invention provides an arrangement wherein gas filter media of the renewable type can be utilized in optimum fashion in a gas flow conduit system.

Various other features of the present invention will become obvious to one skilled in the art upon reading the disclosure set forth hereinafter.

More particularly, the present invention provides a gas filter assembly comprising a longitudinally-extending outer conduit having spaced dirty gas inlet and clean gas outlet means; a gas impervious longitudinally-extending baffle housing disposed within the outer conduit in co-extensive spaced relationship therewith to provide a co-extending gas passage therebetween communicating the dirty gas inlet and the clean gas outlet means and longitudinally-extending filter means disposed within the outer conduit and surrounding the baffle housing to be movably disposed across the gas passage for filtration purposes. In addition, the present invention provides a reactivating means cooperating with the system to renew the filter means as it is fed across the gas treating passage.

It is to be understood that various changes can be made in the arrangement, form and scope of the apparatus disclosed herein without departing from the scope or spirit of the present invention.

Referring to the drawings which disclose one advantageous embodiment of the present invention and a modification thereof:

FIGURE 1 is a broken cross-sectional plan view of the inventive conduit system;

FIGURE 2 is a cross-sectional elevational view taken in a plane passing through line 2—2 of FIGURE 1; and FIGURE 3 is a broken cross-sectional plan view of a portion of a modified gas conduit assembly.

Referring to FIGURE 1 of the drawing, the inventive conduit gas filter assembly designated broadly by reference numeral 2 includes longitudinally-extending outer cylindrical conduit 3 having spaced, axially aligned dirty gas inlet 4 and clean gas outlet 6 with a contraction section 3' therebetween. Disposed within conduit 3 in co-extensive spaced relationship therewith on one side of contraction section 3' is longitudinally-extending baffle housing 7. Housing 7 includes a cylindrical body portion 8 and upstream and downstream conical end portions 9 and 11 respectively. Since housing 7 is of lesser diameter than conduit 3 and is in spaced relationship therewith with conical end portion 11 being spaced from contraction section 3', an annular gas passageway 12 is provided therebetween, the gas passageway 12 communicating at its upstream end with dirty gas inlet 4 and at its downstream end through a contracting portion with clean gas outlet 6.

Surrounding housing 7 is a longitudinally-extending gas impervious cylindrical jacket 13, which is of lesser diameter than conduit 3 but greater than housing 7 to provide filter medium chamber 14. A second longitudinally-extending gas impervious cylindrical jacket member 16 is disposed within conduit 3 downstream of jacket 13, the jacket member 16 serving to define a filter medium chamber 17 spaced from and in axial alignment with chamber 14.

Disposed within chambers 14 and 17 to extend across the gas passageway 12 at the confluence adjacent the clean gas outlet 6 in slidably movable fashion is a longitudinally-extending filter member 18. Filter member 18 which can be formed from any one of a number of known filter materials is in the shape of a pair of oppositely disposed and mating longitudinally-extending semi-cylinders 19 and 21 (FIGURE 2). These cylinders can be inserted into conduit 3 to surround housing 7 and nest in chambers 14 and 17 by removing an annular end plate member 22 at the end of chamber 17. Suitable annular bearing or abutting rings 23 and 24 can be provided at opposite extremities of the filter member 18 within the filter medium chambers. Disposed between ring 23 and end plate 22 is a helical spring 26. Acting against spring 26 to move the filter member 18 across the gas passage is a fluid driven cylinder and piston assembly 27 which is positioned inside baffle housing 7 and connected to a suitable reservoir and selective valve system (not shown) by means of lines 28 and 29. The baffle housing 7 is provided with a pair of oppositely spaced, longitudinally-extending slots 31 (FIGURE 2) through which the ends of drive rod member 32 extend. Member 32, which is fastened to the piston of assembly 27, has its ends which extend through slots 31 into chamber 14 fastened to ring 24. Thus, ring 24 can be slidably moved so as to move filter member 18 from chamber 14 to chamber 17, feeding fresh media across the gas passageway.

Referring to FIGURE 3, a modification of the present invention is disclosed wherein filter member 34 can be made from a suitably selected activated charcoal. A steam reactivating conduit system 33 can be provided to extend across the filter media chamber 36 to reactivate the carbon as the occasion requires. It is to be noted that filter member 34 can further be provided with a blank portion 30 of suitable material to extend around the confluence of the gas passageway in order to shut off the gas flow during a reactivation period, if such is desired. Although not disclosed, it will be obvious that an actuating arrangement such as that disclosed in FIGURE 1 can be utilized with the apparatus of FIGURE 3.

The invention claimed is:

1. A gas filter assembly comprising: a longitudinally extending outer cylindrical conduit having spaced, axially aligned dirty gas inlet and clean gas outlet means, said cylindrical conduit including a contraction section between said inlet and outlet means; a gas impervious longitudinally extending baffle housing having a cylindrical portion and conical end portion disposed within said outer conduit in co-extensive spaced relationship therewith with the conical end portion aligned with and spaced from the contraction section to provide within said outer conduit a longitudinally co-extending annular gas passage including a contracting portion communicating with said dirty gas outlet and said clean gas inlet; a first longitudinally extending cylindrical jacket disposed within said outer conduit surrounding said baffle housing on one side of said contraction section to define a first annular filter media chamber; a second longitudinally extending cylindrical jacket disposed within said outer conduit on the other side of said contraction section to define a second filter media chamber spaced from and in axial alignment with said first filter media chamber; a cylindrical unitary filter media member disposed within one of said filter media chambers; and filter media actuating means to move said media as a unit from one of said media chambers to the other across the contracting portion of said gas passage.

2. The apparatus of claim 1, said filter media actuating means including a power means disposed within said baffle housing, said baffle housing having slot means therein; a filter media driver member disposed within said filter media chamber to engage against the filter media member therein; and a connecting member extending through said slot means to connect said power member with said filter media drive member.

3. The apparatus of claim 1 and filter media reactivating means communicating with one of said filter media chambers to introduce a filter media reactivating agent to the filter media received therein.

References Cited by the Examiner

UNITED STATES PATENTS

| | | | |
|---|---|---|---|
| 699,563 | 5/1902 | Plantings | 55—422 X |
| 1,731,223 | 10/1929 | Brady | 55—474 X |
| 1,995,292 | 3/1935 | Clark. | |

FOREIGN PATENTS

| | | |
|---|---|---|
| 360,280 | 1/1920 | Germany. |
| 541,687 | 12/1931 | Germany. |

ROBERT F. BURNETT, *Primary Examiner.*

D. K. DENENBERG, *Assistant Examiner.*